Jan. 30, 1940.   G. G. YOUNG   2,188,492
BAKEPAN SET
Filed May 4, 1938

George G. Young
INVENTOR
BY Frank Zugelter
ATTORNEY

Patented Jan. 30, 1940

2,188,492

UNITED STATES PATENT OFFICE 2,188,492

BAKEPAN SET

George G. Young, Kansas City, Mo., assignor to The Lockwood Manufacturing Company, Cincinnati, Ohio, a corporation of Ohio Application May 4, 1938, Serial No. 205,999

5 Claims. (Cl. 53—6)

The present invention relates to a bakepan set of the character employed for the baking of buns, rolls and the like.

An object of the invention is to provide a pan set so designed as to insure uniformity in the product baked therein.

Another object of the invention is to provide for the baking of an improved product, by making provision for accurate centering of the plastic dough mass in the mold of the pan set.

Another object is to enable the production of buns or rolls for sandwiches and the like wherein is eliminated the customary concave bottom of the bun or roll.

A further object of the invention is to provide a pan set including improvements which result in rendering the pan set easily slidable during handling, and in the placement and removal thereof from the bake oven floor or shelf.

A further object of the invention is to accomplish the foregoing objects with the use of simple, inexpensive and effective means.

The foregoing and other objects are obtained by the means described herein and disclosed in the accompanying drawing, in which.

It has been matter of general observation that the buns or rolls used in making sandwiches are concave at the bottom or flat face thereof, this condition being in many instances considered an undesirable defect, by reason of the fact that where the meat or filling of the sandwich is thickest, the bun or roll is relatively thin. Thus, the juice of the meat or filling may easily penetrate the lower half of the bun or roll, making it soggy and less tasty at the center location. One of the objects of the present invention, amongst others, is to eliminate this condition in the baking of buns or rolls.

With reference to the accompanying drawing, the character 4 indicates the body portion of a pan set, which supports a plurality of molds 5 for the bakery product. The molds may be integral with the body portion 4, if desired, and by preference they are arranged in rows of a desired number, depending upon the desired capacity of the pan set. The body portion may be provided with a peripheral upstanding wall 6, as shown. The entire structure may be manufactured of a suitable rust and corrosion resisting metal, such as is ordinarily used in the production of bakery pans. The upper edge of the peripheral wall 6 may be reinforced in accordance with common practice as illustrated.

Figure 1:
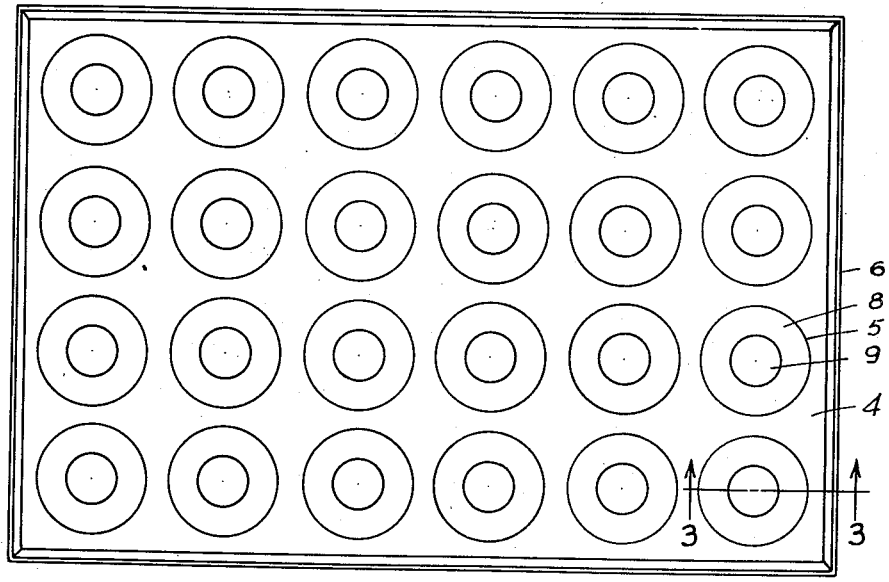
Fig. 1 is a top plan view of a bakepan set embodying the invention.
Figure 2:
Fig. 2 is a side elevational view of the same.
Figure 3:
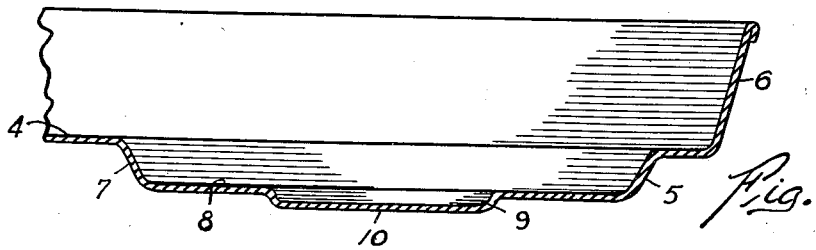
Fig. 3 is an enlarged cross sectional view taken on line 3—3 of Fig. 1.

The roll or bun mold, which is considered that portion of the pan set which is below the level of the body portion 4, may be in the nature of a circular cup-shaped depression having an inclined side wall 7 and a bottom 8 contiguous to the side wall. The central portion of the bottom 8 is pressed downwardly or otherwise formed to furnish a shallow well or depression 9, as is most clearly shown in Fig. 3. It has been discovered in practice, that the well 9 may be rendered most effective for the purposes desired, by making it of a depth approximating one-sixteenth inch ($\frac{1}{16}$"). The diameter of the well preferably approximates half the diameter of the mold bottom. Thus, if the bottom be of a four inch (4") diameter, the diameter of the well would approximate two inches (2"). From the foregoing explanation, it will be understood that the lower face 10 of the well will be the only part of the pan set contacting the hot shelf or floor of the bake oven, and since the bun or roll is thickest directly above the region of the well, there will be a greater convection of baking heat through that portion of the mold which contacts the floor or shelf. It is by reason of this fact that greater uniformity in the baking process is noted on the bottom face of the finished product. The additional thickness of the dough mass where it rests over the well, compensates for the natural elevating of the central portion of the roll or bun bottom during proofing and baking of the product. The said elevating of the mass during the proofing and baking period, is believed to be caused by accumulated gases beneath the bun, sealed against escape by reason of the contact of other portions of the roll or bun with the bottom 8 of the mold. As will be evident, the capacity of the well has been gauged to compensate for any tendency of the dough mass to develop a concavity in its under surface incident to the proofing and baking of the mass. By the use of the present form of mold, it is found that the bun or roll, when discharged from the mold, will have a definitely flat bottom, the central portion of which is thoroughly baked, rather than heavy or doughy.

It is important to note that the substantially centrally located shallow well in the mold bottom reduces considerably the effective dough mass supporting area of the mold bottom at and about its center. The supporting area of the well, however, is considerably less than the effective area of the remainder of the mold bottom. The mold bottom 8, accordingly, furnishes the necessary support for the outer edges of the bun or roll undergoing baking.

By reason of the fact that contacting areas of the pan set are considerably reduced by the provision of the wells 9, it will be found that the pan set will slide or glide with ease over the oven shelf or floor, or over other surfaces upon which it is required to move. The provision of the well has proven effective also for the production of perfect and uniform rolls and buns, by reason of the fact that such well definitely centers the dough mass initially, so that the proofing and expansion of the mass during baking may be unrestricted and balanced, since it will not contact the mold side more strongly at one point than at another point.

As previously stated, the molds may or may not be integral with the body portion of the pan set, nor is it necessary to furnish the set with an upstanding peripheral wall 6, although the form of the invention disclosed is considered preferable from a practical standpoint. It is to be understood that other modifications and changes may be made in the structural details of the device, without departing from the spirit of the invention.

While it is difficult to assign a specific reason for the advantages attained by reason of the formation of the well 19, a logical explanation is that the well or depression retards the contraction of the dough after it has been pressed, by reason of the fact that the well or depression has a tendency to break up the tension attributable to the glutinous element of the dough mass, this treatment insuring less retraction of the dough and resulting in a highly desirable uniformity of size and appearance in the finished product. It should be understood that a board or other means is employed to somewhat flatten the individual masses of dough after placement thereof in the individual wells of the pan set.

What is claimed is:

1. In a baking pan set of the character described, the combination of a body portion providing a support and connector for a plurality of relatively small molds for the formation and baking of buns and rolls, and a plurality of such molds supported by the body portion, each comprising a side wall and a bottom, and a substantially centrally located shallow well in the mold bottom for substantially reducing the effective dough mass supporting area of the mold bottom at and about its center, to the extent that a portion of a dough mass contained within the mold will partially sag into the well while other portions rest upon the surrounding area of the mold bottom, as and for the purpose described.

2. In a baking pan set of the character described, the combination of a body portion providing a support for a plurality of relatively small molds for the baking of buns and rolls, and a plurality of such molds supported by the body portion, each comprising a side wall and a bottom, and a substantially centrally located shallow well in the mold bottom and of an area smaller than the area of the remainder of the mold bottom, permitting limited sagging of the central portion of a plastic dough mass supported mainly upon the surrounding bottom area of the mold, for overcoming the tendency of the dough mass to develop a concavity in its under surface incident to the proofing and baking of the mass.

3. In a baking pan set of the character described, the combination of a body portion including a circumferential upstanding wall, and a series of molds carried by the body portion, each of said molds comprising a side wall and a bottom, and a substantially central well formed in the mold bottom below the level of said bottom.

4. In a baking pan set of the character described, the combination of a body portion and a series of molds carried by the body portion, each of said molds comprising a side wall and a bottom, and means in the bottom of each mold adapted to permit the central portion of a dough mass contained within the mold to sag below the level of the mold bottom while the mass is in the plastic state, thereby to overcome the tendency of the mass to develop a concave lower face during the baking of the dough mass.

5. In a baking pan set of the character described, the combination of a body portion providing a support for a plurality of relatively small molds supported by the body portion, each comprising a side wall and a bottom, and a substantially centrally located shallow well in the mold bottom, of a diameter approximating half the diameter of said mold bottom.

GEORGE G. YOUNG.